(12) United States Patent
Pinney

(10) Patent No.: US 12,328,421 B2
(45) Date of Patent: Jun. 10, 2025

(54) METHOD AND SYSTEM FOR AUTOMATED CRYPTOGRAPHIC SIGNING FOR MFP-GENERATED DOCUMENTS

(71) Applicant: Konica Minolta Business Solutions U.S.A., Inc., Ramsey, NJ (US)

(72) Inventor: Shaun Pinney, Newark, CA (US)

(73) Assignee: Konica Minolta Business Solutions U.S.A., Inc., Ramsey, NJ (US)

( * ) Notice: Subject to any disclaimer, the term of this patent is extended or adjusted under 35 U.S.C. 154(b) by 228 days.

(21) Appl. No.: 18/345,662

(22) Filed: Jun. 30, 2023

(65) Prior Publication Data

US 2025/0008046 A1 Jan. 2, 2025

(51) Int. Cl.
*G06F 21/00* (2013.01)
*H04N 1/44* (2006.01)

(52) U.S. Cl.
CPC ................................. *H04N 1/4486* (2013.01)

(58) Field of Classification Search
None
See application file for complete search history.

(56) References Cited

U.S. PATENT DOCUMENTS

| | | | | |
|---|---|---|---|---|
| 6,028,938 A * | 2/2000 | Malkin | ................... | H04L 9/321 |
| | | | | 380/243 |
| 11,677,547 B1 * | 6/2023 | McDonald | ........... | H04L 9/3247 |
| | | | | 713/171 |
| 11,769,577 B1 * | 9/2023 | Dods | ...................... | G16H 20/10 |
| | | | | 705/50 |
| 11,829,486 B1 * | 11/2023 | Lambotte | ................. | G06N 3/09 |
| 12,177,366 B1 * | 12/2024 | Norton | .................. | H04L 9/3263 |

(Continued)

OTHER PUBLICATIONS

Kirovski, Darko; Jojic, Nebojsa. Cryptographically secure identity certificates. 2004 IEEE International Conference on Acoustics, Speech, and Signal Processing. https://ieeexplore.ieee.org/stamp/stamp.jsp?tp=&arnumber=1327135 (Year: 2004).*

(Continued)

*Primary Examiner* — Jeremiah L Avery
(74) *Attorney, Agent, or Firm* — Buchanan Ingersoll & Rooney PC

(57) ABSTRACT

A method, a non-transitory computer-readable medium, and a multifunction printer (MFP) that generate a signed digital document from a document generated by the multifunction printer. The method includes displaying a third-party screen for a third-party scan or fax workflow; switching to a multifunction printer vendor signing screen and obtaining signing settings for the generation of the signed digital document; calculating a document hash of the generated document using a cryptographic hashing algorithm; sending a digital signing request to a signing server, the digital signing request including the document hash of the generated document and an authenticated account identity of a user; receiving a digital signature and a public digital signing certificate for the user from the signing server; generating the signed digital document by embedding the digital signature and the public digital signing certificate of the user into the generated document; and switching to the third-party screen for the workflow.

20 Claims, 6 Drawing Sheets

(56) References Cited

U.S. PATENT DOCUMENTS

| | | | | |
|---|---|---|---|---|
| 2006/0072144 | A1* | 4/2006 | Dowling | G06F 21/606 |
| | | | | 358/1.15 |
| 2010/0111301 | A1* | 5/2010 | Wanderley | G06F 21/608 |
| | | | | 380/243 |
| 2017/0070350 | A1* | 3/2017 | Ryu | H04L 63/0838 |
| 2022/0351192 | A1* | 11/2022 | McGregor | G06Q 20/3827 |
| 2023/0344653 | A1* | 10/2023 | Vestemean | G06T 5/90 |
| 2023/0376581 | A1* | 11/2023 | Shear | G06F 21/32 |
| 2024/0028107 | A1* | 1/2024 | Willardson | H04W 12/33 |
| 2024/0171393 | A1* | 5/2024 | Bathen | H04L 9/30 |
| 2024/0202724 | A1* | 6/2024 | Graham | G06Q 20/3821 |

OTHER PUBLICATIONS

Dai, Yue; Su, Shenghui. A Diploma Anti-forgery System Based on Lightweight Digital Signatures. 2014 Tenth International Conference on Computational Intelligence and Security. https://ieeexplore.ieee.org/stamp/stamp.jsp?tp=&arnumber=7016976 (Year: 2014).*

Mahbooba, Basim; Schukat, Michael. Digital certificate-based port knocking for connected embedded systems. 2017 28th Irish Signals and Systems Conference (ISSC). https://ieeexplore.ieee.org/stamp/stamp.jsp?tp=&arnumber=7983645 (Year: 2017).*

\* cited by examiner

METHOD AND SYSTEM FOR AUTOMATED CRYPTOGRAPHIC SIGNING FOR MFP-GENERATED DOCUMENTS

FIELD OF THE DISCLOSURE

The present disclosure relates to a method and system for automated cryptographic signing for multifunction printer-generated (MFP-generated) documents, and more particularly, a method and system for automated secure efficient cryptographic signing for multifunction printer-generated (MFP-generated) document by authenticated users during third-party scan or fax workflows using biometrics and multi-factor authentication (MFA).

BACKGROUND

As organizations look for increased document management capabilities at the multifunction printer, they may select third-party applications to enhance the base multifunction printer workflows. For example, third-party applications can provide scan workflows which can be optimized for each user, so that each user is presented with their own preferred default options when starting a scan job, including which document type is used to store the scanned document, for example, Portable Document Format (PDF) and XPS. Then, as users scan paper documents to multifunction printers (MFPs), such as by a scan-to-PDF job, they can quickly complete the scan using preferred settings and move towards transferring the scanned digital file off the multifunction printer and sharing the scanned digital file with other users.

For secure scanning workflows, users may also want to cryptographically sign the digital file before sending the document so that any other user receiving the document can cryptographically verify that the document was created by the expected user and was not modified after being signed by the expected user. Use of the scanning user's digital certificate to digitally sign the scanned document can fulfill this need. The signature process typically requires a document hash calculated from the scanned document as input, as well as the user's private key embedded within the user's digital certificate, and then outputs a digital signature is output using a cryptographic hashing algorithm. However, typical approaches to obtain the user's private key to begin the signing operation at the multifunction printer can be difficult, are non-scalable, are non-intuitive, and/or not secure.

For instance, multifunction printer setup involves either installing every user's digital certificate to each multifunction printer in the organization or distributing physical Public Key Infrastructure (PKI) cards to each user, and wherein the PKI card contains the user's digital certificate with a private key. The first case of installing every user's digital certificate has a relatively high maintenance cost, as it must be done by administrators each time a new multifunction printer enters the organization. Additionally, as multifunction printers are transitioned out of organizations, administrators have the risk of neglecting to clear the multifunction printer data and introducing security risks by distributing internal user data outside the organization. Accordingly, it would be best not to distribute user's digital certificates across multiple multifunction printers.

The PKI card case requires additional burdens of cost and management of PKI cards by administrators, as well as requiring users to have the PKI card in their possession to achieve digital signing. Additionally, PKI cards can be lost, misplaced, and require additional cost to manage and issue each PKI card.

Currently, these burdens are not adequately addressed by typical base multifunction printer capabilities or addressed by third-party applications, which offer advanced scan workflows. The above approaches do solve a security challenge in that they avoid transferring the user's private key contained within the digital certificate across the network, where it may be intercepted and placed at risk of compromise. In particular, the transferring of the user's private key contained within the digital certification across the network is considered a security risk to the user's identity that should be avoided.

Accordingly, it would be desirable to have a solution that keeps private key off the network and enables digital signing of multifunction printer generated documents.

SUMMARY

In accordance with an exemplary embodiment, a secure scanning system is disclosed, which integrates seamlessly with third-party applications and seamlessly adds document signing capabilities that can enable secure scan workflows for users and organizations. Additionally, the method and system does not require users to have additional devices to achieve digital signing, nor does the method and system require storage, configuration, or administration of user certificates on each multifunction printer. For example, devices such as PKI cares are not required to be issued to each user, which can further reduce administrative costs and risks.

In addition, the method and system as disclosed can also avoiding transfer of the user's private key (embedded within the user's digital certificate) over the network to maintain security of the user's identity and the resulting ease of use, ease of administration, and private key security features also enables organizations to enable document signing and secure scanning workflows with third-party scan management applications.

In accordance with an aspect, a method for generating a signed digital document from a document generated by a multifunction printer (MFP), the method comprising: displaying, by the multifunction printer, a third-party screen for a third-party scan or fax workflow; switching, by the multifunction printer, to a multifunction printer vendor signing screen and obtaining signing settings for the generation of the signed digital document; calculating, on the multifunction printer, a document hash of the document generated by the multifunction printer using a cryptographic hashing algorithm; sending, by the multifunction printer, a digital signing request to a signing server, the digital signing request including the document hash of the document generated by the multifunction printer and an authenticated account identity of a user; receiving, by the multifunction printer, a digital signature and a public digital signing certificate for the user from the signing server; generating, by the multifunction printer, the signed digital document by embedding the digital signature and the public digital signing certificate of the user into the document generated by the multifunction printer; and switching, by the multifunction printer, to the third-party screen for the third-party scan or fax workflow.

In accordance with another aspect, a non-transitory computer-readable medium (CRM) storing computer program code executed by a computer processor that performs a process for generating a signed digital document from a document generated by a multifunction printer (MFP), the processing comprising: displaying, by the multifunction printer, a third-party screen for a third-party scan or fax workflow; switching, by the multifunction printer, to a multifunction printer vendor signing screen and obtaining signing settings for the generation of the signed digital document; calculating, on the multifunction printer, a document hash of the document generated by the multifunction printer using a cryptographic hashing algorithm; sending, by the multifunction printer, a digital signing request to a signing server, the digital signing request including the document hash of the document generated by the multifunction printer and an authenticated account identity of a user; receiving, by the multifunction printer, a digital signature and a public digital signing certificate for the user from the signing server; generating, by the multifunction printer, the signed digital document by embedding the digital signature and the public digital signing certificate of the user into the document generated by the multifunction printer; and switching, by the multifunction printer, to the third-party screen for the third-party scan or fax workflow.

In accordance with another aspect, a multifunction printer comprising: a processor, the processor configured to: display a third-party screen for a third-party scan or fax workflow; switch to a multifunction printer vendor signing screen and obtain signing settings for the generation of the signed digital document; calculate a document hash of the document generated by the multifunction printer using a cryptographic hashing algorithm; send a digital signing request to a signing server, the digital signing request including the document hash of the document generated by the multifunction printer and an authenticated account identity of a user; receive a digital signature and a public digital signing certificate for the user from the signing server; generate the signed digital document by embedding the digital signature and the public digital signing certificate of the user into the document generated by the multifunction printer; and switch to the third-party screen for the third-party scan or fax workflow.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, explain the principles of the invention.

DETAILED DESCRIPTION

Figure 1:
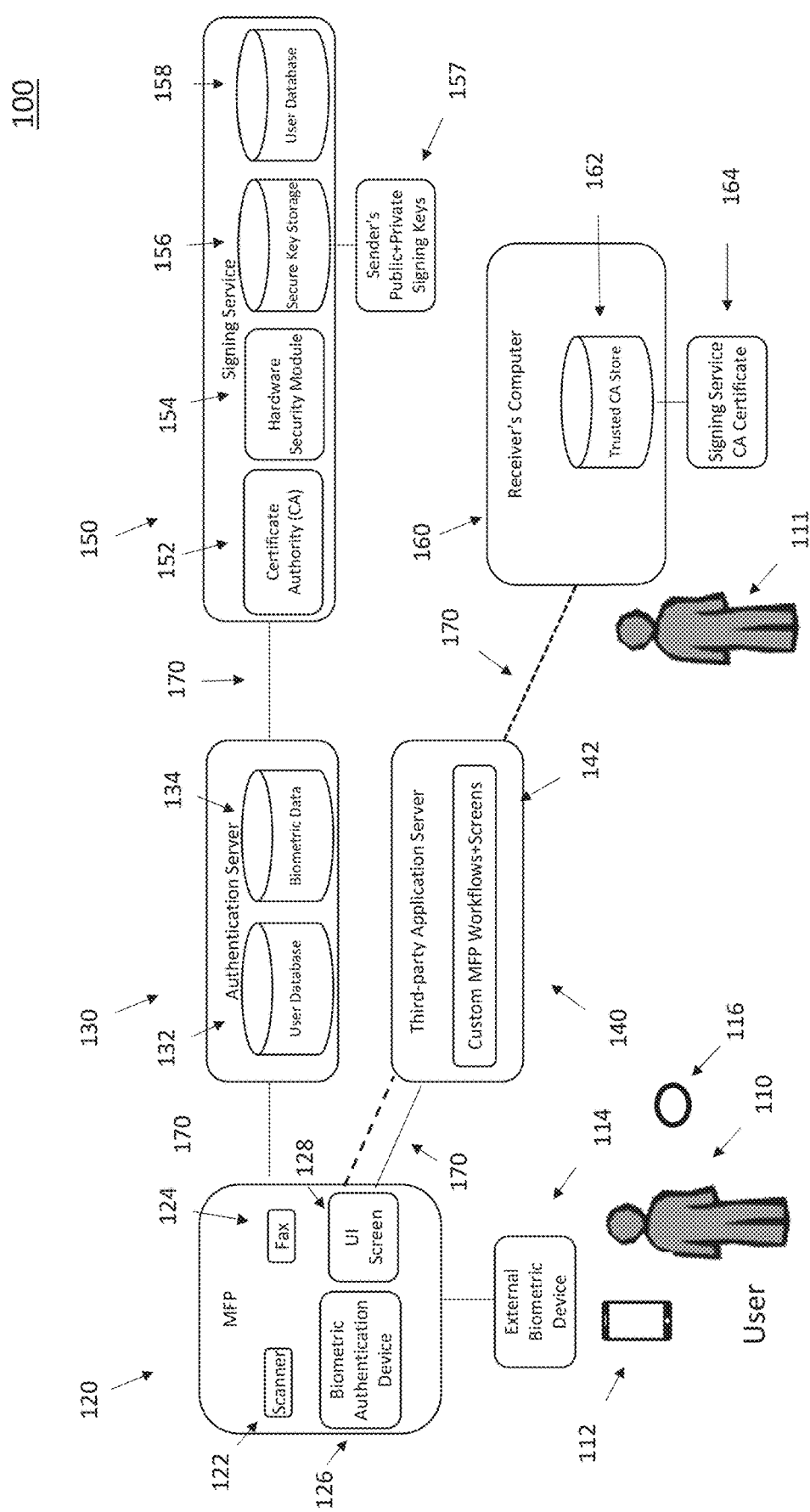
FIG. 1 is an illustration of a system for automated cryptographic signing for multifunction printer-generated (MFP-generated) documents in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of a system 100 for automated cryptographic signing for multifunction printer-generated (MFP-generated) documents. As shown in FIG. 1, the system 100 can include a multifunction printer 120, one or more servers or computers 130, 140, 150, 160, which can be, for example, an authentication server 130, a third-party application server 140, a signing service (or signing server) 150, and a personal computer 160. The system 100 can also include a user 110 and an optional biometric device, for example, a client device 112, an external biometric device or reader 114, or a biometric authentication device 126 that is part of the multifunction printer 120, for example, the user interface 128 of the multifunction printer 120 can be reader for obtaining biometric data. The client device 112 can also be configured to send resources to the multifunction printer 120 and/or as an authentication device, for example, for two-factor authentication (2FA) or multi-factor authentication (MFA).

The client device 112, the multifunction printer 120, and the one or more servers 130, 140, 150, 160 can be configured to communicate with one another via a communication network or network 170. The communication network or network 170 can be a public telecommunication line and/or a network (for example, LAN or WAN). Examples of the communication network 170 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF), infrared (IR) transmission, or Bluetooth technology.

The multifunction printer 120 can include a scanner engine (or scanner) 122, a facsimile (fax) engine 124, a biometric authentication device 126, and a user interface or graphical user interface (GUI) 128 (i.e., display unit or user interface screen). In accordance with an exemplary embodiment, the user interface 128 may include high-definition multimedia interface (HDMI), digital visual interface (DVI), video graphics array (VGA), etc. The display user interface 128 may be any suitable type of display for displaying data including a cathode ray tube (CRT) display, liquid crystal display (LCD), light-emitting diode (LED) display, capacitive touch display, thin-film transistor (TFT) display, etc.

The multifunction printer 120 (e.g., a printer or printing device) can also include a network interface (I/F), which is connected to the communication network (or network) 170, a processor or central processing unit (CPU), and one or more memories for storing software programs, for example, firmware for the multifunction printer and data (such as files to be printed). For example, the software programs can include a printer controller and a tray table. The processor or CPU carries out the instructions of a computer program, which operates and/or controls at least a portion of the functionality of the multifunction printer 120. The multifunction printer 120 can also include a printer engine, a plurality of paper trays, and a colorimeter.

The colorimeter can be an inline colorimeter (ICCU) (or spectrophotometer), which measures printed color patches to generate color profiles. For example, the colorimeter (or spectrophotometer) can be one or more color sensors or colorimeters, such as a RGB scanner, a spectral scanner with a photo detector or other such sensing device known in the art, which can be embedded in the printed paper path, and an optional finishing apparatus or device. The multifunction printer 120 also includes an operating system (OS), which manages the computer hardware and provides common services for efficient execution of various software programs. In accordance with an exemplary embodiment, it can be within the scope of the disclosure for the multifunction printer to be a copier and scanner.

For example, in accordance with an exemplary embodiment, an image processing section within the multifunction printer 120 can carry out various image processing under the control of a print controller or CPU and sends the processed print image data to the print engine. The image processing section can also include a scanner section (scanner engine) for optically reading a document, such as an image recognition system. The scanner section receives the image from the scanner engine and converts the image into a digital image. The print engine forms an image on a print media (or recording sheet) based on the image data sent from the image processing section. The central processing unit (CPU) (or processor) and the memory can include a program for RIP processing (Raster Image Processing), which is a process for converting print data included in a print job into Raster Image data to be used in the printer or print engine. The CPU can include a printer controller configured to process the data and job information received, for example, received via the network connection unit and/or input/output section (I/O section).

The CPU can also include an operating system (OS), which acts as an intermediary between the software programs and hardware components within the multifunction printer. The operating system (OS) manages the computer hardware and provides common services for efficient execution of various software applications. In accordance with an exemplary embodiment, the printer controller can process the data and job information received, for example, from the client device 112 to generate a print image.

In accordance with an exemplary embodiment, the network I/F performs data transfer with, for example, the one or more servers 130, 140, 150, 160, and/or the client device 112. The printer controller can be programmed to process data and control various other components of the multifunction printer to carry out the various methods described herein. In accordance with an exemplary embodiment, the operation of printer section commences when the printer section receives a page description from the client device 112 via the network I/F in the form of a print job data stream and/or fax data stream. The page description may be any kind of page description languages (PDLs), such as PostScript® (PS), Printer Control Language (PCL), Portable Document Format (PDF), and/or XML Paper Specification (XPS). Examples of a multifunction printer 120 consistent with exemplary embodiments of the disclosure include, but are not limited to, a multifunction printer or multifunction peripheral (MFP), a laser beam printer (LBP), an LED printer, a multifunction laser beam printer including copy function.

In accordance with an exemplary embodiment, the client device 112 can be a security identification and authentication device, which uses automated methods of verifying or recognizing the identity of a living person based on a physiological or behavioral characteristic. Thus, the user 110 need not to manually input passwords to the multifunction printer 120. The method of recognizing the user 110 can include, for example, fingerprints, electrocardiogram (ECG or EKG) information, facial images, iris, and voice recognition. For example, in accordance with an exemplary embodiment, an external biometric device (or reader) 114, or an internal biometric authentication device 126 that includes an interface, for example, an input/display configured to detect a fingerprint of a user 110 can be used. Alternatively, a wearable device 116, for example, a Nymi™ band, which detection of the user 110 is based on the electrocardiogram (ECG) and its unique properties, i.e., electrical activity of the heartbeat of the wearer can be used to obtain biometric data of the user 110.

In accordance with an exemplary embodiment, the wearable device 116 of the user 110 may communicate with the client device 112, for example, a mobile client, tablet, or personal computer, when Bluetooth or Near Field Communication (NFC) or other protocols are available to transfer and/or receive the biometric data, access codes and/or temporary codes as disclosed herein. For example, the client device 112 may include a display unit or graphical user interface, which can access, for example, a web browser in the memory of the client device 112. The client device 112 also includes the operating system (OS), which manages the computer hardware and provides common services for efficient execution of various software programs.

In accordance with an embodiment, the user 110 via, for example, the mobile device 112, can present an authenticator, for example, a biometric identifier to the multifunction printer (MFP) 120. The multifunction printer 120 receives the biometric identifier and compares the biometric identifier to those biometric identifiers that have been stored in the biometric authentication device 126. If the biometric identifier of the user 102 has been stored in the biometric authentication device 126, the multifunction printer 120 will authenticate the user 120 and issue, for example, an authentication token (e.g., which can include a user identity and authentication cookies) that can be used by the user 110 and the MFP 120 to retrieve resources, for example, managed print services 142, for example, custom multifunction printer workflows and screens from the third-party application server 140.

Alternatively, if the biometric identifier of the user 110 received by the multifunction printer (MFP) 120 is not contained within the multifunction printer (MFP) 120, the multifunction printer 120 can forward the biometric identifier of the user 110 to the authentication provider 130 (for example, an identity provider (IdP)) that can authenticate the biometric identifier of the user 110 via a user database 132. If the biometric identifier of the user 110 is contained within the database 132, the authentication server 130 can send an authentication token (for example, which can include a user identity and authentication cookie) to the multifunction printer (MFP) 120 for the user 110 to access the managed print services 142 hosted on the third-party application server 140. For example, the third-party application server 140 can include third-party applications can provide scan workflows which can be optimized for each user, so that each user is presented with their own preferred default options when starting a scan job, including which document type is used to store the scanned document, for example, Portable Document Format (PDF) and XPS The authentication server 130 and the corresponding database 132 can be an identity provider (IdP) configured to store and manage digital identities of one or more users 110.

The identity provider (IdP) can authentication the user 110, for example, based on biometric information (or biometric data), and if the biometric information (biometric data) is verified based on the user database 132 and biometric data 134 of the authentication server 130, the authentication server 130 can authorize the user 110 to access, for example, one or more applications or managed print services that are hosted on the third-party application server 140.

The method and system for automated cryptographic signing for multifunction printer-generated (MFP-generated) documents can include a third-party application 142 that has scan management capabilities. The third-party applications 140 installed with scan management capabilities may not support any digital signing options. In accordance with an embodiment, users 110 at the multifunction printer (MFP) 120 can be prompted to first authenticate with the third-party application 140, then the user 110 can select scan settings using the third-party application 140 and begin one or more scan jobs. As scan settings are selected on the user interface screen 128 of the multifunction printer 120, the user 110 can choose a digital document format which supports embedding digital signatures, such as PDF or XPS, and the user can start the scan job by placing one or more sheets or documents on a reader of the multifunction printer 120.

When the scan job is completed and the digital document is available, instead of prompting the user 110, for example, for a PKI card tap to create a digital signature using the user's certificate stored on the PKI card or creating a digital signature using pre-installed user certificates on the multifunction printer (MFP) 120, the signature operation can be performed by switching the user interface (or MFP user screen) 128 from the third-party scan application to a multifunction printer (MFP) vendor screen, which prompts the user 110 to sign by authenticating with a biometric identifier that can be obtained from the client device 112 of the user, a biometric device 114 attached to the multifunction printer 120, such as a fingerprint reader, or from a biometric authentication device 126 associated with the user interface 128 of the multifunction printer 120. The obtaining of the biometric identifier from the user 110 can avoid the need to distribute PKI cards to each user 110 and can also provide a "physical trigger" for the document signing operation which can be akin with physical operations, for example, physically sign a document with a pen. In addition, since the client device 112, the biometric device 114, or the biometric authentication device 126 associated with the user interface 128 of the multifunction printer 120 do not contain user digital certificates to provide the private key needed for the signing operation, the method and system as disclosed avoids the need to store private keys of users 110 on the multifunction printer (MFP) 120 or to transfer private keys of users 110 over the network 170.

After the user 110 is authenticated, for example, by touching their finger to a fingerprint reader or otherwise authenticated with the client device 112, the biometric device 114, or the biometric authentication device 126 associated with the user interface 128 captures the biometric information (biometric data) of the user 110. The multifunction printer 120 securely transfers the biometrics (i.e., biometric data) of the user 110 to the authentication server 130 over the network 170, for example, using a secure transport layer security (TLS) connection. The authentication server 130 can identify the user 110 based on the biometrics of the user 110 as authenticated user (i.e., verification of the user 110) and informs the multifunction printer (MFP) 120 by providing the multifunction printer 120 with a token (i.e., "user token") which uniquely represents the successful authentication of the user 110 via a biometric identifier.

In accordance with an embodiment, to prepare for signing of the scanned document, the multifunction printer 120 can calculate a document hash from the scanned document using, for example, a cryptographic hashing algorithm, such as SHA-256. The multifunction printer 120 securely requests the authentication server 130 to sign the document hash. The multifunction printer 120 can supply the authentication server 120 with the document hash and the token (e.g., user token). The authentication server 120 verifies that the user token is valid and can initiate a signing request to a signing service (or signing server) 150. The authentication server 130 supplies the document hash and the authenticated account identity of the user 110 to the signing service 150.

The signing service 150 confirms that the authentication server 130 is a trusted identity provider. For example, in accordance with an embodiment, the signing service 150 confirmation of the authentication server 130 as a trusted identity provider can be done, for example, using Single Sign On (SSO) technologies, or if the signing service 150 is maintained by a separate organization from the authentication server 130, the confirmation of the authentication server 130 can be done, for example, using Federated Identity Management (FIM) technologies such as SAML, OAuth, or OpenID.

The signing service 150 supplies the account identity of the user 110 and document hash to a module, for example, an internal Hardware Security Module 154 (HSM) of the signing service 150 and requests a signing operation. The HSM 154 looks up the user's existing digital signing certificate or generates a new digital signing certificate with a public/private key pair, extracts the private key and starts the signing operation with the document hash. The HSM 154 supplies the resulting digital signature (e.g., signed document hash) to the signing service 150 and the user's public digital certificate containing the user's public key. The resulting digital signature does not include the private key of the user 110. The exclusion of the private key of the user 110 can help ensure the user's private key is not transmitted over the network 170.

Figure 2:
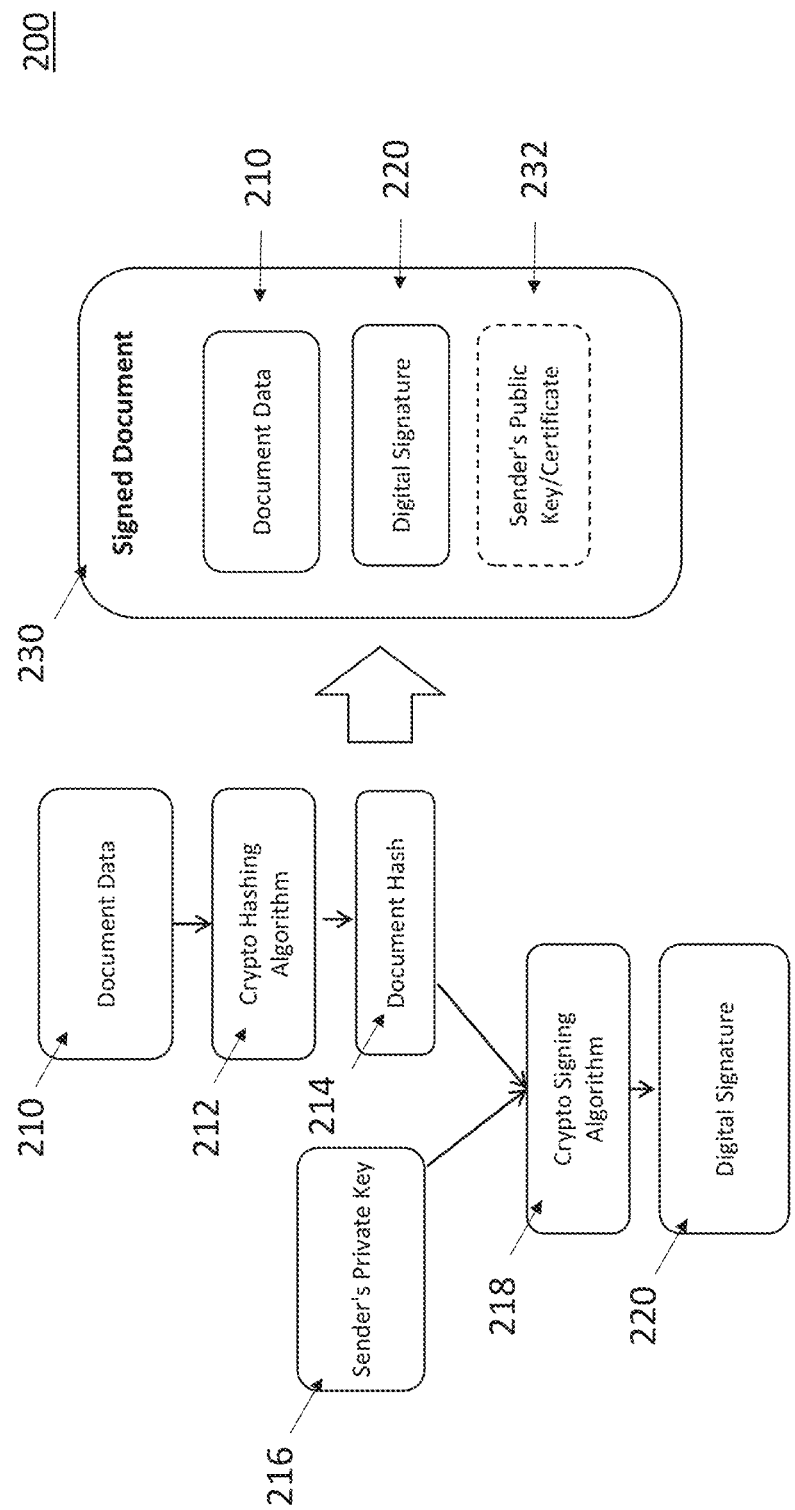
FIG. 2 is a diagram illustrating a signed digital document generated by an MFP-generated in accordance with an embodiment.
Figure 3:
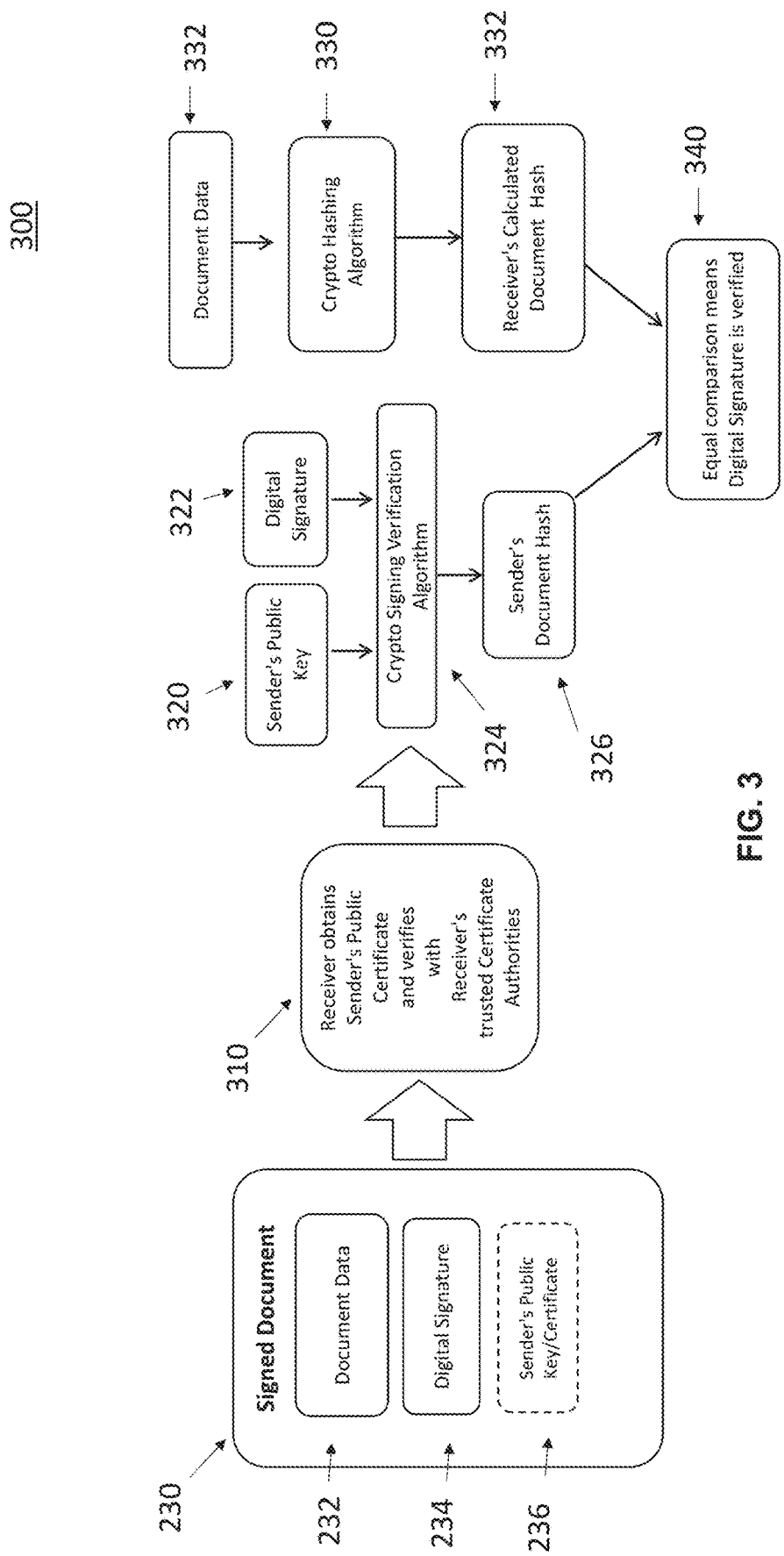
FIG. 3 is a diagram illustrating the verification of the signed digital document generated by the MFP-generated in accordance with an embodiment.

In accordance with an embodiment, the user's public digital signing certificate can be issued by a certification authority (CA) 152 of the signing service 150. For the recipient 111 (e.g., computer 160 of the recipient 111) to verify the digital signature, the signing service's CA 152 certificate must be trusted by the document recipient 111, which can be achieved by installing the CA certificate of the signing service 150 in the trusted certificate store 162 of the computer 160 of the recipient 111. The signing service 150 forwards (or supplies) the resulting digital signature and public signing certificate of the user 110 to the authentication server 130. The authentication server 150 forward (or supplies) the digital signature and the public signing certificate of the user 110 to the multifunction printer 120. The multifunction printer 120 embeds the digital signature into the digital document (e.g., PDF or XPS file) along with the public signing certificate of the user 110 to generate a signed digital document 230 (FIGS. 2 and 3). The multifunction printer 120 can then return screen control (i.e., user interface screen 128) to the third-party scan application. The multifunction printer 120 can notify the third-party scan application that the signed digital document 230 is ready. The third-party scan application can display any remaining third-party screens needed to complete the scan workflow.

In accordance with an embodiment, at completion, the signed digital document 130 can be supplied to the user 110, for example, at the location specified by the user scan settings of the multifunction printer 120. For example, the location specified by the user scan setting of the multifunction printer 120 can be to an email of the user 110, a computer or server, for example, a computer 160 of a recipient 111, a folder, a hard drive, or thumb drive. The user 110, for example, can distribute the signed digital document 130 to the computer 160 of the recipient 111. In accordance with an embodiment, the person computer 160 of the recipient 111 can include a trusted Certificate Authority (CA) configured to store, for example, a public digital signing certificate 164 of the user 110. The computer 160 of a recipient 111 can be configured to verify the public digital signing certificate of the user 110 in the signed digital document 230 as disclosed herein.

In accordance with an embodiment, when a user 110 and a corresponding recipient 111 receives the signed digital document 230 as shown in FIGS. 2 and 3, the method and system as disclosed can use a cryptographic approach to verify the public digital signing certificate of the user 110. For example, by using a cryptographic approach, the method and system for method and system for automated cryptographic signing for multifunction printer-generated (MFP-generated) documents can help keep costs relatively low.

FIG. 2 is an illustration of a method 200 for automated cryptographic signing of a multifunction printer-generated (MFP-generated) document. As shown in FIG. 2, a cryptographic hashing algorithm 212 is applied to the document data 210 to generate a document hash 214 of the document data 210. A private key of the sender (or user 110) is applied to the document hash 214 using a cryptographic hashing algorithm 218 to generate a digital signature 320 for the signed digital document 230. The signed digital document 230 includes the document data 210, the digital signature 220, and public key/certificate of the sender (i.e., user 110).

FIG. 3 is an illustration of a method 300 for verification of the signed digital document 220. As shown in FIG. 3, for example, the recipient 111, for example, a computer 160 of the recipient obtains the sender's public certificate and verifies with the receivers trusted certificate authorities 320. For example, the receivers trusted certificate authorities 320 can be trusted certificate storage 162 on the computer 160 of the recipient 111.

In accordance with an embodiment, the signature verification of the signed digital document 230 can occur using a process in which the computer 160 of the recipient 111 is configured with the trusted certificate authority (CA) 162 that stores the certificate authority (CA) certificate which issued the public digital signing certificate of the user (i.e., sender) 110. In accordance with an embodiment, the certificate authority (CA) certificate 162 may be preinstalled by the operating system (OS) vendor or obtained from the signing service 150. The recipient 111 can receive the signed digital document 230 (for example, a PDF or an XPS) and opens the signed digital document 230 using an appropriate viewer (or application). The viewer (application) extracts the digital signature and the public signing certificate of the sender (or user 110) from the digital document. The viewer (or application) also calculates the document hash from the signed digital document 230 using the same algorithm used during document signing, for example, SHA-256.

The viewer then supplies the document hash and the sender's public key from the sender's public signing certificate to a digital signature verification algorithm (for example, a digital signature algorithm (DSA) or an elliptical curve digital signature algorithm (ECDSA)). The viewer receives the result from the digital signature verification algorithm and notifies the recipient 111 if the signature is valid.

In accordance with an embodiment, instead of prompting the user (or sender) 110 to perform only biometric authentication, an option can be provided to prompt the user 110 for an authenticator, for example, a PIN (personal identification number) to enable two-factor authentication (2FA) or multifactor authentication (MFA).

In accordance with another embodiment, instead of prompting the user (or sender) 110 to perform biometric authentication when scan document is ready, the prompt can be skipped if the user 110 has already been authenticated earlier, for example, to access the multifunction printer 120 and/or the third-party application server 140, for example, for access to the custom multifunction workflows and screens including scan management or fax management applications (e.g., iFax). For example, the fax management application on the multifunction printer 120 can send facsimiles (faxes) directly to a server, for example, a personal computer 160 of the recipient 111.

In accordance with a further embodiment, instead of the multifunction printer 120 requesting signing of the digital document to the authentication server 130, the multifunction printer 120 may send the request for the signing of the digital document (i.e., document data 210) directly to the signing service 150.

In according with the above disclosed embodiments, the method and system for automated cryptographic signing for multifunction printer-generated (MFP-generated) documents can transparently enable document signing for third-party scan applications without modifications to third-party applications. For example, new screens can be injected into third-party scan workflows as needed to prompt user to perform biometric authentication to trigger signing, and which method allows users (or senders) 110 to sign documents without bringing PKI cards to the MFP or storing user certificates on multiple MFPs. In addition, secure signing can be triggered and execute in a way that allows natural biometric approaches to trigger signing and a connection to perform signing without distributing user private keys over the network. Additionally, recipients 111 can rather easily verify the document signature using existing tools and simple methods such as adding the signing service's CA certificates to the recipient's trusted CA store. Administrative and maintenance costs can also be minimized while extending functionality to enable secure scan workflows.

In accordance with an embodiment, the method and system for automated cryptographic signing for multifunction printer-generated (MFP-generated) documents can also include third-party Fax workflows, in addition to scan workflows. For example, similar to PDF and XPS, the method and system for automated cryptographic signing for multifunction printer-generated (MFP-generated) documents can be a facsimile (Fax) format, for example, iFax, that supports embedded signatures.

Figure 4:
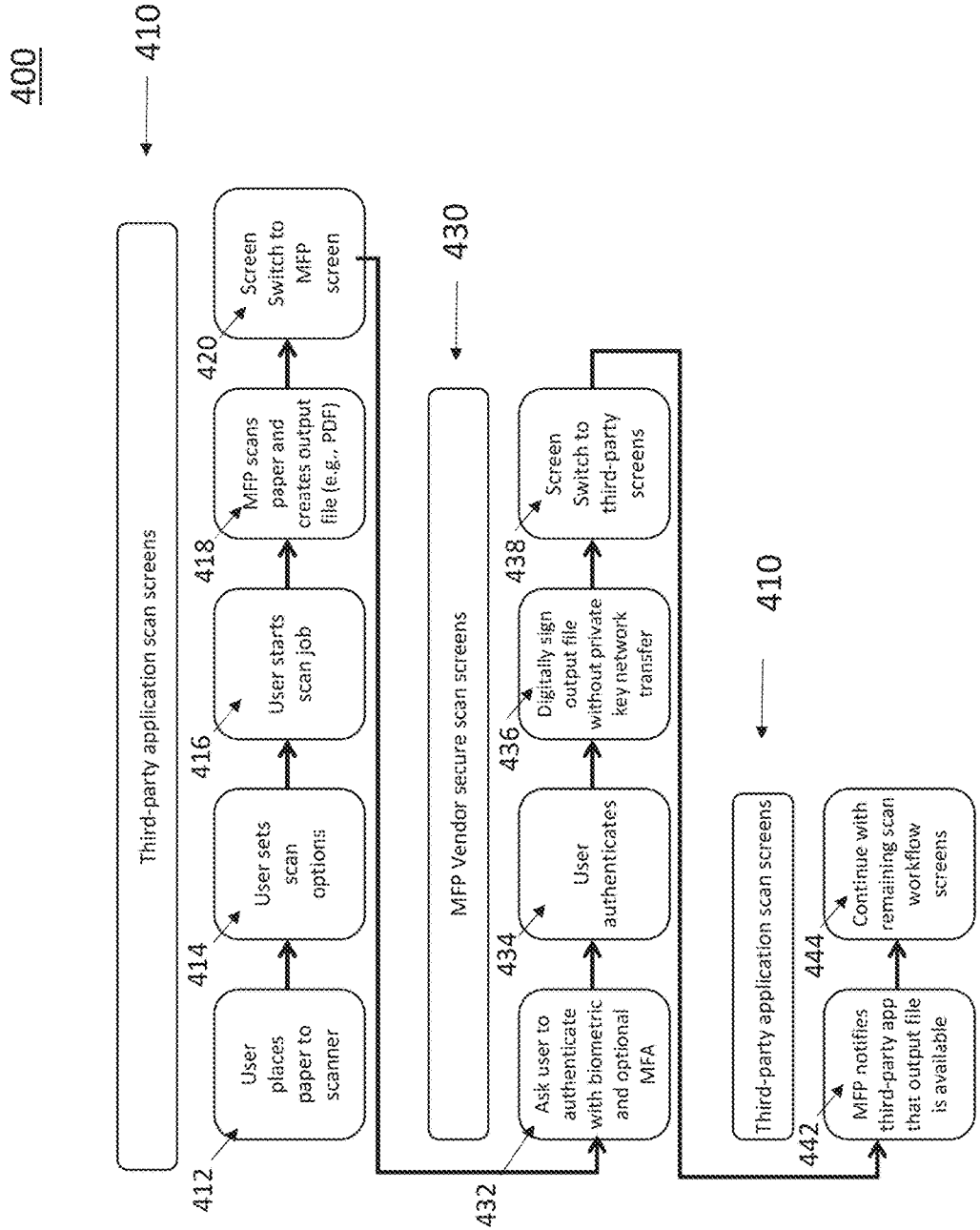
FIG. 4 is a flow diagram illustrating a method for completing a scan job with a digital signature as shown on a user interface of a multifunction printer in accordance with an embodiment.

FIG. 4 is a flow diagram illustrating a method 400 for completing a scan job with a digital signature as shown on the user interface 128 of the multifunction printer 120 in accordance with an embodiment. As shown in FIG. 4, the multifunction printer 120 can include third-party application screens 410 and multifunction vendor secure screens 420 for execution of the process to generate a digital signature as disclosed herein. The process can be initiated with the third-party application screens in step 412 by the user placing paper to a scanner of the multifunction printer 120. In step 414, the user 110 can set scan options, for example, resolution of the scanned image, type of scanned image, for example, PDF, XPS file, destination of the scanned image, and the like. In step 416, the user 110 starts the scan job. In step 418, the multifunction printer 120 scans the paper and creates an output, for example, a PDF or an XPS file. In step 420, the user interface screen 128 switches to the screen 430 of the vendor or manufacture of the multifunction printer 120, for example, Konica Minolta (R).

In accordance with an embodiment, the screen 430 of the vendor or manufacturer of the multifunction printer 120 is preferably a secure scan screen, which in step 432 prompts the user 110 to authenticate with a biometric identifier and an optional multi-factor authenticator (MFA). For example, the biometric identifier can be one or more physiological characteristic of the user 110, and the one or more physiological characteristic can be selected from one or more of fingerprints, palm veins, face recognition, DNA (deoxyribonucleic acid), palm print, hand geometry, iris recognition, retina, and/or odor/scent.

In step 434, the user 110 provides the biometric identifier to one or more of the client device 112, the external biometric device 114 associated with the multifunction printer 120, or the biometric device 126 associated with the user interface 128 of the multifunction printer 120 and is authenticated by the authentication server 130 as disclosed. In step 436, the multifunction printer 120 can digitally sign the created output without the private key of the user 110 being transferred over the network 170. In step 438, the vendor screen 430 is switched to the third-party application scan screen 410. In step 442, the multifunction printer 120 notifies the third-party application that the output file is available. In step 444, the user 110 can continue with remaining scan workflow screens.

Figure 5:
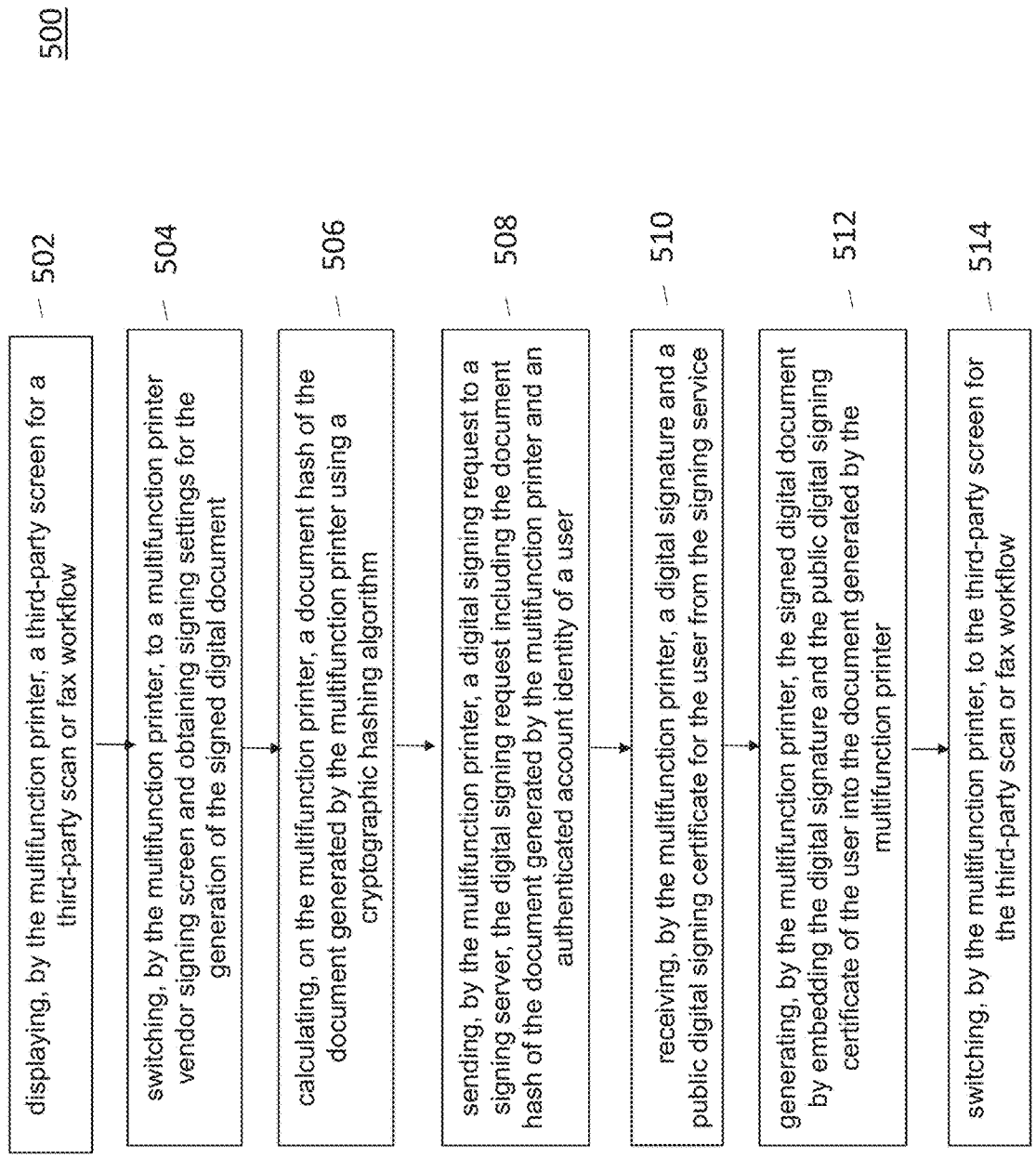
FIG. 5 is a flowchart illustrating a method for generating a signed digital document from a document generated by a multifunction printer (MFP) in accordance with an exemplary embodiment.

FIG. 5 is a flowchart illustrating a method 500 for generating a signed digital document from a document generated by a multifunction printer (MFP) 120 in accordance with an exemplary embodiment. As shown in FIG. 5, in step 502, the multifunction printer 120 displays a third-party screen for a third-party scan or fax workflow. In step 504, the multifunction printer 120 switches to a multifunction printer vendor signing screen and obtains signing settings for the generation of the signed digital document. In step 506, on the multifunction printer 120, a document hash of the document generated by the multifunction printer 120 is calculated using a cryptographic hashing algorithm. In step 508, a digital signing request to a signing server is sent by the multifunction printer 120. The digital signing request can include the document hash of the document generated by the multifunction printer 120 and an authenticated account identity of a user 110. In step 510, the multifunction printer 120 receives a digital signature and a public digital signing certificate for the user 110 from the signing server. In step 512, the multifunction printer 120 generates the signed digital document by embedding the digital signature and the public digital signing certificate of the user 110 into the document generated by the multifunction printer 120. In step 514, the multifunction printer 112 switches to the third-party screen for the third-party scan or fax workflow. The document generated by the multifunction printer 120 can be a scanned document, or a facsimile (Fax). In addition, the cryptographic hashing algorithm can be, for example, SHA-256.

In accordance with an embodiment, the signing settings obtained for the generation of the signed digital document by the multifunction printer 120 can include, for example, asking the user 112 to authenticate with a biometric identifier and optional multifactor authenticator to obtain the authenticated account identify of the user 110. In addition, the signing settings can include input from the user 110 on the configuration of the digital signature 220 for the signed document 230 including type of output file (e.g., scan or fax) that is being digitally signed, type or number of digital signatures that are being generated, for example, the signed document 230 can include, two or more digital signatures 220 (i.e., from two or more users 110), and other adjustments or changes to the configurations of the signing service 150 that can be applied in the generation of the digital signature 220 on the signed document 230.

In accordance with an embodiment, the authenticated account identity of the user 110 can include authenticating, on the multifunction printer 120, the user 110 with a biometric identifier; receiving, by the multifunction printer 120, a user token from an authentication server 130 that the biometric identifier of the user 110 has been successfully authenticated; and sending, by the multifunction printer 120, the user token from the authentication server 130 with the digital signing request to the signing server. In addition, the authenticated account identity of the user 110 can further include receiving, by the signing server, the user token from the authentication server 130 with the digital signing request from the multifunction printer 120; confirming, by the signing server 140, that the authentication server 120 is a trusted identity provider; supplying, from the authentication server 130 upon confirmation by the signing server 140 that the authentication server 130 is the trusted identity provider, a request for a signing operation, the request for the signing operation including an account identity of the user 110 and the document hash of the document generated by the multifunction printer 120 to a security module 154 within the signing server 140; locating or generating, by the security module 154 of the signing server 140, a digital signature certificate with a public/private key pair for the user; and locating or generating, by the security module 154 of the signing server 140, the public digital signing certificate, which excludes a private key from the public/private key pair of the user of the digital signing certificate.

In accordance with an embodiment, the signing server 140 can generate or create a new key pair (i.e., public/private key pair) for each signing request for the user 110. Alternatively, instead of generating or creating a new key pair for each signing request for the user 110, the signing server 140 may use a previously generated key pair (i.e., public/private key pair) for the user 110.

In accordance with a further embodiment, the authenticated account identity of the user 110 can include authenticating, on the multifunction printer 120, the user 110 with a biometric identifier; receiving, by the multifunction printer 120, a user token from an authentication server 130 that the biometric identifier of the user 110 has been successfully authenticated; sending, by the multifunction printer 120, the user token from the authentication server 130 to the authentication server 130 with the digital signing request for the authentication server 130 to forward the digital signing request to the signing server.

In accordance with an embodiment, the method can include forwarding, by the multifunction printer 120, the signed digital document to a server 160; retrieving, from the server 160, the signed digital document with a digital signature verification program; and opening, in the digital signature verification program, the signed digital document. The method can also include extracting, by the digital signature verification program, the digital signature and the public digital signing certificate of the user from the signed digital document received from the multifunction printer

120; calculating, by the digital signature verification program, a recipient document hash of the signed digital document received from the multifunction printer 120; comparing, by the digital signature verification program, the calculated recipient document hash of the signed digital document received from the multifunction printer 120 with the document hash of the document generated by the multifunction printer 120; and verifying, by the digital signature verification program, the signed digital document when the calculated recipient document hash of the signed digital document received from the multifunction printer 120 matches the document hash of the document generated by the multifunction printer 120. In accordance with an embodiment, the digital signature verification program can be, for example, Adobe Acrobat Reader®.

In accordance with an embodiment, the server, for example, a personal computer 160, can act as a file transfer server that receives the signed digital document and distributes the digital document from the multifunction printer 120 to another recipient 111, for example, via e-mail or a filesharing server.

In accordance with another embodiment, the method can include supplying, by the multifunction printer 120 to the authentication server 130, the document hash of the document and an authentication token received from the authentication server 130; and requesting, by the multifunction printer 120, that the authentication server 130 initiate the digital signing request with the signing server 140 of the document hash of the document.

In accordance with a further aspect, the method can include displaying, on a display panel of the multifunction printer 120, a screen prompting from the user 110 a biometric identifier; receiving, by the multifunction printer 120, the biometric identifier from the user 110 from a biometric authenticator device, the biometric authenticator device including one or more of a sensor, a scanning device, or an electronic reader, and wherein the biometric identifier of the user 110 is one or more physiological characteristic of the user 110, and wherein the one or more physiological characteristic is selected from one or more of fingerprints, palm veins, face recognition, DNA (deoxyribonucleic acid), palm print, hand geometry, iris recognition, retina, and/or odor/scent; and authenticating, on the multifunction printer 120, the user 110 with the biometric identifier. In addition, the method can include requesting, by the multifunction printer 120, an authenticator in addition to the biometric identifier of the user 110, the authenticator providing for multi-factor authentication (MFA).

In accordance with an embodiment, one or more new screens can be injected by a multifunction printer vendor into the third-party scan or fax workflow of the third-party screen. For example, the one or more new screens can be a request or prompt for the user to submit a biometric identifier as disclosed herein.

In accordance with an embodiment, the method can include authenticating, by the multifunction printer 120, the user 110 for each signed digital document. The method can also include authenticating, by the multifunction printer 120, the user 110 before beginning the method for generating the signed digital document from the document generated by the multifunction printer 120 (MFP). In addition, the method can also include authenticating, by the multifunction printer 120, the user 110 for the signed digital document; and enforcing, by the multifunction printer 120, a user authentication request timing from one or more external servers that are used in the generation of the signed digital document from the document generated by the multifunction printer 120.

Figure 6:
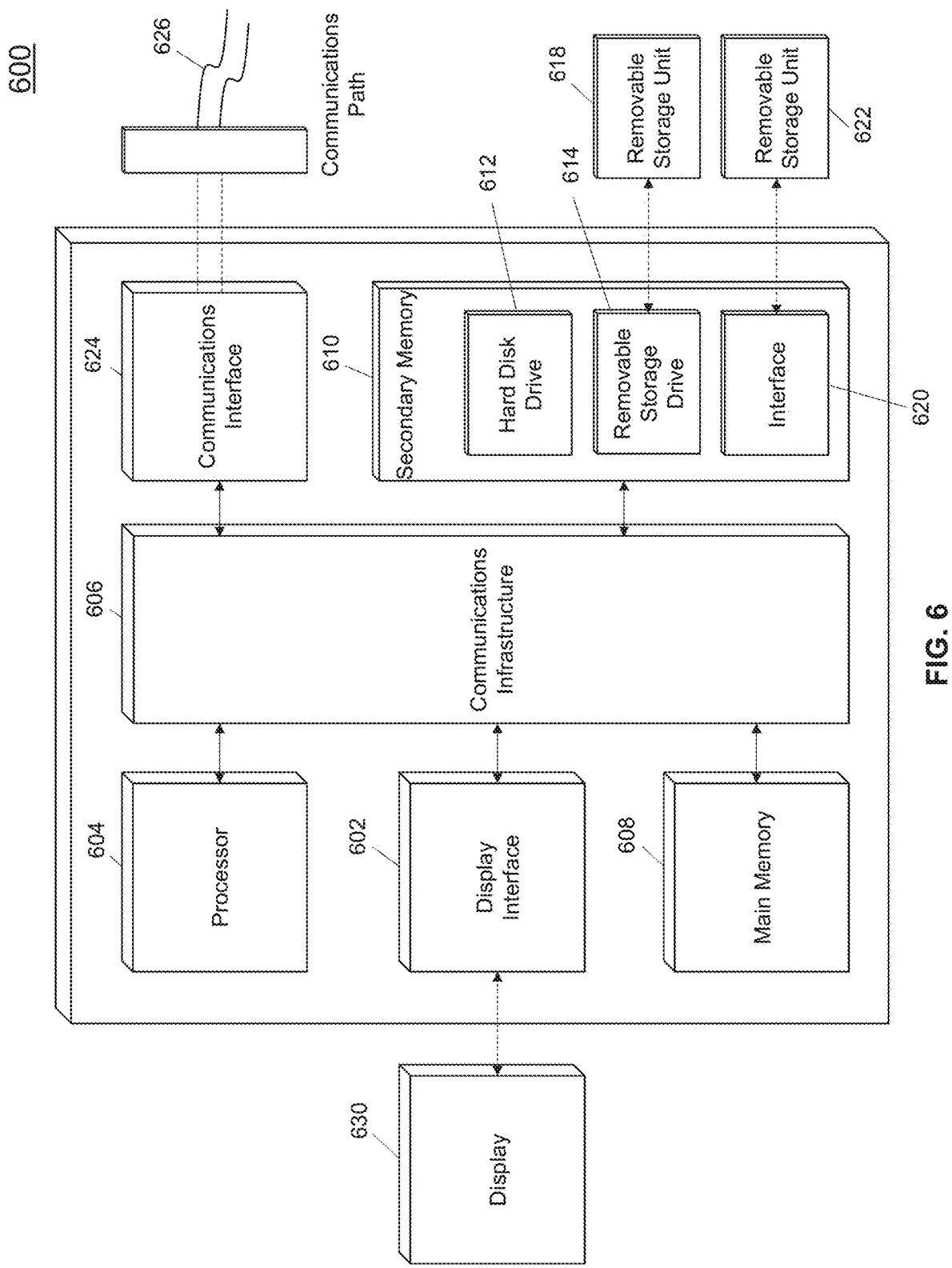
FIG. 6 is an illustration of an exemplary hardware architecture for an embodiment of a computer system.

FIG. 6 illustrates a representative computer system 600 in which embodiments of the present disclosure, or portions thereof, may be implemented as computer-readable code executed on hardware. For example, the client device 112, the multifunction printer 120, and the one or more computer systems 130, 140, 150, 160 associated with the method and system for generating a signed digital document from a document generated by a multifunction printer (MFP) as disclosed herein may be implemented in whole or in part by a computer system 600 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer-readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this representative computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 604 may be processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc. Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 1-5, as discussed herein. Accordingly, such computer programs may represent controllers of the computer system 600. Where the present disclosure is implemented using software executed on hardware, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software executed on hardware, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present disclosure may be implemented such that its software part has been written onto a recording medium in advance and will be read as required in operation.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for generating a signed digital document from a document generated by a multifunction printer (MFP), the method comprising:
   displaying, by the multifunction printer, a third-party screen for a third-party scan or fax workflow;
   switching, by the multifunction printer, to a multifunction printer vendor signing screen and obtaining signing settings for the generation of the signed digital document;
   calculating, on the multifunction printer, a document hash of the document generated by the multifunction printer using a cryptographic hashing algorithm;
   sending, by the multifunction printer, a digital signing request to a signing server, the digital signing request including the document hash of the document generated by the multifunction printer and an authenticated account identity of a user;
   receiving, by the multifunction printer, a digital signature and a public digital signing certificate for the user from the signing server;
   generating, by the multifunction printer, the signed digital document by embedding the digital signature and the public digital signing certificate of the user into the document generated by the multifunction printer; and
   switching, by the multifunction printer, to the third-party screen for the third-party scan or fax workflow.

2. The method according to claim 1, wherein the document generated by the multifunction printer comprises:
   scanning, by the multifunction printer, a document; or
   generating, by the multifunction printer, a facsimile (Fax).

3. The method according to claim 1, wherein the authenticated account identity of the user comprises:
   authenticating, on the multifunction printer, the user with a biometric identifier;
   receiving, by the multifunction printer, a user token from an authentication server that the biometric identifier of the user has been successfully authenticated; and
   sending, by the multifunction printer, the user token from the authentication server with the digital signing request to the signing server.

4. The method according to claim 3, further comprising:
   receiving, by the signing server, the user token from the authentication server with the digital signing request from the multifunction printer;
   confirming, by the signing server, that the authentication server is a trusted identity provider;
   supplying, from the authentication server upon confirmation by the signing server that the authentication server is the trusted identity provider, a request for a signing operation, the request for the signing operation including an account identity of the user and the document hash of the document generated by the multifunction printer to a security module within the signing server;
   locating or generating, by the security module of the signing server, a digital signature certificate with a public/private key pair for the user; and
   locating or generating, by the security module of the signing server, the public digital signing certificate, which excludes a private key from the public/private key pair of the user of the digital signing certificate.

5. The method according to claim 1, wherein the authenticated account identity of the user comprises:
   authenticating, on the multifunction printer, the user with a biometric identifier;
   receiving, by the multifunction printer, a user token from an authentication server that the biometric identifier of the user has been successfully authenticated;
   sending, by the multifunction printer, the user token from the authentication server to the authentication server with the digital signing request for the authentication server to forward the digital signing request to the signing server.

6. The method according to claim 1, further comprising:
   forwarding, by the multifunction printer, the signed digital document to a server;
   retrieving, from the server, the signed digital document with a digital signature verification program; and
   opening, in the digital signature verification program, the signed digital document.

7. The method according to claim 6, further comprising:
   extracting, by the digital signature verification program, the digital signature and the public digital signing certificate of the user from the signed digital document received from the multifunction printer;
   calculating, by the digital signature verification program, a recipient document hash of the signed digital document received from the multifunction printer;
   comparing, by the digital signature verification program, the calculated recipient document hash of the signed digital document received from the multifunction printer with the document hash of the document generated by the multifunction printer; and
   verifying, by the digital signature verification program, the signed digital document when the calculated recipient document hash of the signed digital document received from the multifunction printer matches the document hash of the document generated by the multifunction printer.

8. The method according to claim 1, further comprising:
supplying, by the multifunction printer to the authentication server, the document hash of the document and an authentication token received from the authentication server; and
requesting, by the multifunction printer, that the authentication server initiate the digital signing request with the signing server of the document hash of the document.

9. The method according to claim 1, further comprising:
injecting, by the multifunction printer, a screen prompting from the user a biometric identifier into the third-party scan or fax workflow;
receiving, by the multifunction printer, the biometric identifier from the user from a biometric authenticator device, the biometric authenticator device including one or more of a sensor, a scanning device, or an electronic reader, and wherein the biometric identifier of the user is one or more physiological characteristic of the user, and wherein the one or more physiological characteristic is selected from one or more of fingerprints, palm veins, face recognition, DNA (deoxyribonucleic acid), palm print, hand geometry, iris recognition, retina, and/or odor/scent; and
authenticating, on the multifunction printer, the user with the biometric identifier.

10. The method according to claim 9, further comprising:
requesting, by the multifunction printer, the user provide additional authenticator factors in addition to the biometric identifier of the user for multi-factor authentication (MFA).

11. The method according to claim 1, further comprising:
injecting, by a multifunction printer vendor, one or more new screens into the third-party scan or fax workflow.

12. The method according to claim 1, further comprising:
authenticating, by the multifunction printer, the user for each signed digital document.

13. The method according to claim 1, further comprising:
authenticating, by the multifunction printer, the user before beginning the method for generating the signed digital document from the document generated by the multifunction printer (MFP).

14. The method according to claim 1, further comprising:
authenticating, by the multifunction printer, the user for the signed digital document; and
enforcing, by the multifunction printer, a user authentication request timing from one or more external servers that are used in the generation of the signed digital document from the document generated by the multifunction printer.

15. A non-transitory computer-readable medium (CRM) storing computer program code executed by a computer processor that performs a process for generating a signed digital document from a document generated by a multifunction printer (MFP), the processing comprising:
displaying, by the multifunction printer, a third-party screen for a third-party scan or fax workflow;
switching, by the multifunction printer, to a multifunction printer vendor signing screen and obtaining signing settings for the generation of the signed digital document;
calculating, on the multifunction printer, a document hash of the document generated by the multifunction printer using a cryptographic hashing algorithm;
sending, by the multifunction printer, a digital signing request to a signing server, the digital signing request including the document hash of the document generated by the multifunction printer and an authenticated account identity of a user;
receiving, by the multifunction printer, a digital signature and a public digital signing certificate for the user from the signing server;
generating, by the multifunction printer, the signed digital document by embedding the digital signature and the public digital signing certificate of the user into the document generated by the multifunction printer; and
switching, by the multifunction printer, to the third-party screen for the third-party scan or fax workflow.

16. The computer-readable medium according to claim 15, wherein the authenticated account identity of the user comprises:
authenticating, on the multifunction printer, the user with a biometric identifier;
receiving, by the multifunction printer, a user token from an authentication server that the biometric identifier of the user has been successfully authenticated; and
sending, by the multifunction printer, the user token from the authentication server with the digital signing request to the signing server.

17. The computer-readable medium according to claim 16, further comprising:
receiving, by the signing server, the user token from the authentication server with the digital signing request from the multifunction printer;
confirming, by the signing server, that the authentication server is a trusted identity provider;
supplying, from the authentication server upon confirmation by the signing server that the authentication server is the trusted identity provider, a request for a signing operation, the request for the signing operation including an account identity of the user and the document hash of the document generated by the multifunction printer to a security module within the signing server;
locating or generating, by the security module of the signing server, a digital signature certificate with a public/private key pair for the user; and
locating or generating, by the security module of the signing server, the public digital signing certificate, which excludes a private key from the public/private key pair of the user of the digital signing certificate.

18. The computer-readable medium according to claim 16, wherein the authenticated account identity of the user comprises:
authenticating, on the multifunction printer, the user with a biometric identifier;
receiving, by the multifunction printer, a user token from an authentication server that the biometric identifier of the user has been successfully authenticated;
sending, by the multifunction printer, the user token from the authentication server to the authentication server with the digital signing request for the authentication server to forward the digital signing request to the signing server.

19. A multifunction printer comprising:
a processor, the processor configured to:
display a third-party screen for a third-party scan or fax workflow;
switch to a multifunction printer vendor signing screen and obtain signing settings for the generation of the signed digital document;
calculate a document hash of the document generated by the multifunction printer using a cryptographic hashing algorithm;

send a digital signing request to a signing server, the digital signing request including the document hash of the document generated by the multifunction printer and an authenticated account identity of a user;

receive a digital signature and a public digital signing certificate for the user from the signing server;

generate the signed digital document by embedding the digital signature and the public digital signing certificate of the user into the document generated by the multifunction printer; and switch to the third-party screen for the third-party scan or fax workflow.

20. The multifunction printer according to claim 19, wherein the processor is configured to:

authenticate the user with a biometric identifier;

receive a user token from an authentication server that the biometric identifier of the user has been successfully authenticated; and send the user token from the authentication server with the digital signing request to the signing server.

\* \* \* \* \*